(12) United States Patent
Knothe

(10) Patent No.: US 9,821,718 B2
(45) Date of Patent: Nov. 21, 2017

(54) STEP PLATE WITH STRAIN GAUGE ELEMENT

(71) Applicant: Gebr. Bode GmbH & Co. KG., Kassel (DE)

(72) Inventor: Uwe Knothe, Friedland (DE)

(73) Assignee: Gebr. Bode GmbH & Co. KG. (DE)

( * ) Notice: Subject to any disclaimer, the term of this patent is extended or adjusted under 35 U.S.C. 154(b) by 0 days.

(21) Appl. No.: 15/513,342

(22) PCT Filed: Sep. 22, 2014

(86) PCT No.: PCT/EP2014/070116
§ 371 (c)(1),
(2) Date: Mar. 22, 2017

(87) PCT Pub. No.: WO2016/045691
PCT Pub. Date: Mar. 31, 2016

(65) Prior Publication Data
US 2017/0291552 A1    Oct. 12, 2017

(51) Int. Cl.
*B60R 3/02* (2006.01)

(52) U.S. Cl.
CPC ........... *B60R 3/02* (2013.01); *B60Y 2400/301* (2013.01)

(58) Field of Classification Search
CPC .................................. B60R 3/00; B60R 3/002
See application file for complete search history.

(56) References Cited

U.S. PATENT DOCUMENTS

| 8,297,635 | B2 * | 10/2012 | Agoncillo | ................. B60R 3/02 280/163 |
| 8,342,550 | B2 * | 1/2013 | Stickles | .................... B60R 3/00 280/163 |
| 9,505,330 | B2 * | 11/2016 | Hirtenlehner | ........ B61D 23/025 |
| 2015/0352992 | A1 | 12/2015 | Hirtenlehner et al. | |

FOREIGN PATENT DOCUMENTS

| DE | 10351988 A1 | 11/2004 |
| DE | 102009039035 A1 | 3/2011 |
| EP | 2033870 A1 | 3/2009 |
| WO | 2014107756 A1 | 7/2014 |

OTHER PUBLICATIONS

International Preliminary Report on Patentability for Application No. PCT/EP2014/070116 dated Jan. 18, 2017, 6 pages.
International Search Report for Application No. PCT/EP2014/070116 dated Dec. 12, 2014, 3 pages.

* cited by examiner

*Primary Examiner* — John Walters
*Assistant Examiner* — James Triggs
(74) *Attorney, Agent, or Firm* — McCarter & English, LLP

(57) ABSTRACT

The invention relates to a sliding step for a public transit vehicle, which sliding step comprises a tread plate that can be horizontally extended or retracted by means of a drive, with two lateral arms and a tread surface arranged between the lateral arms, whereby the tread plate is provided with at least two rollers associated with the lateral arms, which rollers run on a track attached to the vehicle. At least one of the lateral arms in the area of the rollers is provided with an offset section arranged between the two rollers and comprising a strain gauge element for detecting deformations.

11 Claims, 4 Drawing Sheets

STEP PLATE WITH STRAIN GAUGE ELEMENT

CROSS-REFERENCE TO RELATED APPLICATIONS

This patent application is a national phase application of PCT/EP2014/070116 filed Sep. 22, 2014, entitled "Step Plate Having Expansion Element," which is hereby expressly incorporated by reference as part of the present disclosure.

TECHNICAL FIELD

The invention relates to a sliding step for a public transit vehicle with a tread plate that can be horizontally extended or retracted.

BACKGROUND OF THE INVENTION

Sliding steps are used to facilitate people boarding and deboarding public transit vehicles. For that purpose, they have a foldout and retractable tread plate with a sturdy tread surface. The tread plate is usually accommodated inside a frame serving as a receptacle, which is firmly attached to the vehicle.

In principle, there are several approaches to determine forces which act upon the tread plate. On the one hand, there must be entrapment protection; on the other hand, the tread plate must not be retracted as long as persons are standing on it. For that reason, sliding steps are often equipped with sensors to recognize any top or lateral loads.

In known sliding steps, sensing of the tread plate is often accomplished by means of a tread contact mat and/or proximity switches. Since the required height of access systems is becoming increasingly lower, it is more and more difficult to accommodate the detection elements. In addition, these are relatively susceptible to malfunction and subject to a high degree of wear due to unavoidable factors such as mechanical vibrations, dirt, moisture, splash water or frost.

To solve this problem, there are approaches that use bending sensors or strain gauges in the access system or sliding step. In principle, several positions are suitable for attaching the strain gauges. The main problem is that displacement occurs when the components or positions are under load. This displacement can be measured and evaluated as a signal with a strain gauge.

For example, a system is known from German Patent Publication No. DE 103 51 988 A1 in which the troublesome forces are detected in that the frame of the boarding/access arrangement is attached to the vehicle bottom with elastomer springs, thus allowing the frame to tilt by means of load cells comprising range springs and strain gauges. This requires a certain type of installation of the boarding/access arrangement to the vehicle. However, this is unsatisfactory due to the large number of different vehicle types. Furthermore, these known boarding/access arrangements have strain gauges which are arranged between the slideable tread plate and an associated guide of a crank drive and/or between a tilting and sliding tread plate and a carrier bar coupled therewith. This design is also very complex and has the disadvantage that complex towing cables or the like are necessary to connect the strain gauge to the necessary control units for the drive. This not only increases manufacturing costs, but is also connected with undesirable wear and tear, resulting in malfunction.

German Patent Publication No. DE 10 2009 039 035 A1 shows a tread frame and a tread plate linearly sliding therein. For detecting the forces applied to the tread plate, especially the vertical forces, at least one measuring element is provided which is arranged in the area of the at least one fastening element of a frame. According to an embodiment, the measuring element can contain a strain gauge such as a push-in type strain gauge. The installation and maintenance of the measuring element is relatively complex. In addition, the arrangement cannot easily be applied to other types of sliding steps without the need of technical modifications.

With the known systems, it is also often difficult to protect the strain gauges against mechanical stress. To solve this problem, complete strain gauge systems are often used such as strain sensors, torque sensors or force transducers such as shear force transducers, load cells, pressure load cells, force measuring bolts or tension and compression force sensors. As a rule, these systems are protected by accommodating them in their own housing to be attached to existing components.

It has also been tried to use strain gauges on a sliding step to directly evaluate the curvature of the lateral arms of the tread plate. However, no reliable readings could be obtained with strain gauges that were bolted onto the insides of both lateral arms, since even the sequence in which the fastening bolts were tightened had a great effect on the measuring signal. In addition, with a load, the zero point shifted to such an extent that a reliable evaluation was almost impossible.

SUMMARY OF THE INVENTION

It is the object of the invention to provide a sliding step with improved sensing, thus avoiding the disadvantages of the state of art. The sliding step allows more reliable measuring, the space it occupies is smaller, and a simpler installation and dismantling is possible. In particular, the sliding step is also to be suited for retrofitting into existing systems, if applicable, also with only minor adjustments.

At least one of the lateral arms of the sliding step has an offset section in the area of the rollers, which is arranged between two rollers and comprises a strain gauge element to measure deformations.

Advantageously, the offset area extends on a horizontal plane, i.e. on the foldout/retraction plane of the tread plate. However, in principle, depending on the type of installation, a vertical offset is also possible. In the description of the invention that follows, a horizontal offset applies.

The strain gauge element is arranged diagonal to the substantially straight lateral arm. The diagonal position of the strain gauge element largely prevents torsional effects that could occur due to the crank arm of the laterally arranged roller.

Advantageously, the offset section comprises at least two strain gauge elements which measure independently of each other and whose readings can be evaluated independently of each other. The two strain gauge elements extend substantially in a horizontal plane and are measuring mainly deformation in vertical direction, especially coming from above. However, depending on the evaluation software, forces impacting from other directions can also be evaluated. According to the invention, especially the use of at least two strain gauge elements allows or improves the sensing of forces acting diagonally to the vertical or even of horizontally active forces.

The sensing of horizontally acting forces is often done at different positions of the tread surface. To ensure a meaningful measurement in every case, the invention provides for measuring in at least two positions (e.g. to the right and left of the lateral arms of the tread plate). The measuring results or signals are combined into a sum signal. Thus, the sum signal provides a load-related value that is independent of the position of the load application and independent of the extension position of the foldout assembly.

In a particularly advantageous design variant, at least one of the two lateral arms is formed by a substantially straight lateral arm assembly and a sensor arm assembly, which forms the offset section. The lateral arm assembly and the sensor arm assembly are positively connected to each other, and each have one of the rollers.

Thus, the sensor arm assembly can be subsequently attached to a free end of the lateral arm. The free end is provided in the foldout direction in the rear of the tread plate, which means that when a housing is used, the free end is usually in the housing of the sliding step. Thus, the lateral arm is configured in two parts, whereby both assemblies, the lateral arm assembly and the sensor arm assembly, each carry a roller. According to the invention, it is quite possible to retrofit sliding steps with sensor arm assemblies, whereby it is unnecessary to completely exchange the sliding step or the tread plate.

The offset has the effect that the rollers on both assemblies are aligned to each other, i.e. arranged behind each other in foldout/retraction direction and can therefore roll off together in a track fastened to the vehicle.

The connection of the lateral arm assembly and the sensor arm assembly can be either fixed or releasable, for example by means of bolts.

According to the invention, at least one feather key can be provided in the area of the bolted connection by means of which feather key especially the shear forces can be transmitted. The feather key can be positioned in foldout/retraction direction in front of or behind the bolted connection, but also below or above. An additional feather key can also be used when another connection such as a rivet connection is provided instead of a bolted connection.

Due to the arrangement of the strain elements in foldout direction behind the connection of the lateral arm assembly and the sensor arm assembly, the measuring zone is also in the foldout direction of the tread plate behind the connection. This allows the connection between the assemblies to have only a minor effect on the measuring signal. With this arrangement, it is almost impossible for the zero point to shift.

To improve the absorption of horizontally acting forces, the invention can provide the use of profile rollers which cannot slide laterally in the rail fastened to the vehicle. This means that the lateral or horizontally acting forces are transmitted via the tread plate onto the profile roller and via it into the strain gauge element.

In a particularly advantageous design variant, an inventive sliding step is provided on one side with cylindrical straight track rollers and on the other side with profile rollers. On the one hand this means that lateral and horizontal forces can be detected and on the other hand, that a tolerance compensation is possible with regard to the width of the tread plate or the distance between the tracks.

The cylindrical track rollers absorb the vertical forces, which occur when the foldout is stepped upon. The profile rollers absorb the horizontal forces, caused for example by twisting through lateral impacts.

The profile rollers absorb vertical and horizontal forces, which occur when someone steps on the foldout and/or upon lateral impact. Horizontal forces can be caused, for example, when the foldout is twisted due to lateral impact.

According to the invention, the sensor arm assembly is designed such that it can be attached to both sides of the two lateral arm assemblies. To this effect, drill holes can be provided for the bolted connections, or the feather key can be arranged symmetrically. In a particularly advantageous version of an embodiment, two drill holes are provided for bolted connections, which extend horizontally through a connection part of the sensor arm assembly. Thanks to the symmetrical design, a sensor arm assembly can be attached to the right or left lateral arm assembly.

Since the required installation space for the sensor assembly is small, the inventive system is particularly well suited for foldout systems with two or more sliding steps arranged above each other. This is particularly advantageous when the vehicle is used in different countries, which may have different standards for the prescribed height of the foldout device. Thus, the vehicle can be operated in two countries with different access heights. The control for the sliding steps can be such that the driver operates a switch when he/she crosses a national border, thus determining which of the sliding steps are to be folded out at the various stops.

The sliding steps can also be controlled such that the foldouts are extended to a different width at different stations, thus turning the tread surfaces into stairs.

BRIEF DESCRIPTION OF THE DRAWINGS

A possible embodiment of the invention is described below with reference to the figures, where.

DETAILED DESCRIPTION

Figure 1:
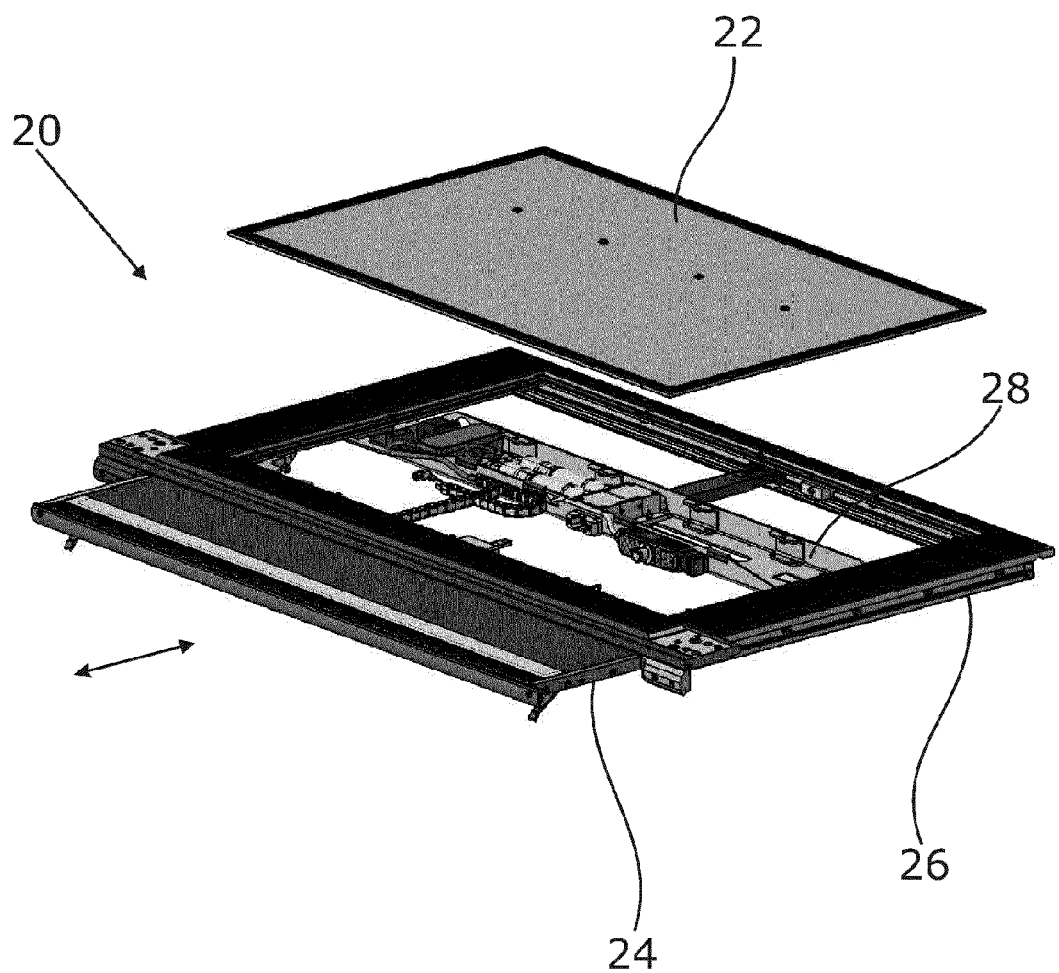
FIG. 1 shows a perspective view of a sliding step with a frame.

FIG. 1 shows a perspective view of a sliding step 20. For a better view, a cover plate 22 is shown in raised position. A tread plate 24 runs in a frame 26. Frame 26 is firmly connected to a vehicle (not shown), usually below a door.

Tread plate 24 can be moved to fold out or to retract, as the arrow indicates. Inside the frame 26, a crossbar 28 is provided which in the embodiment shown carries a drive and other necessary components.

Figure 2:
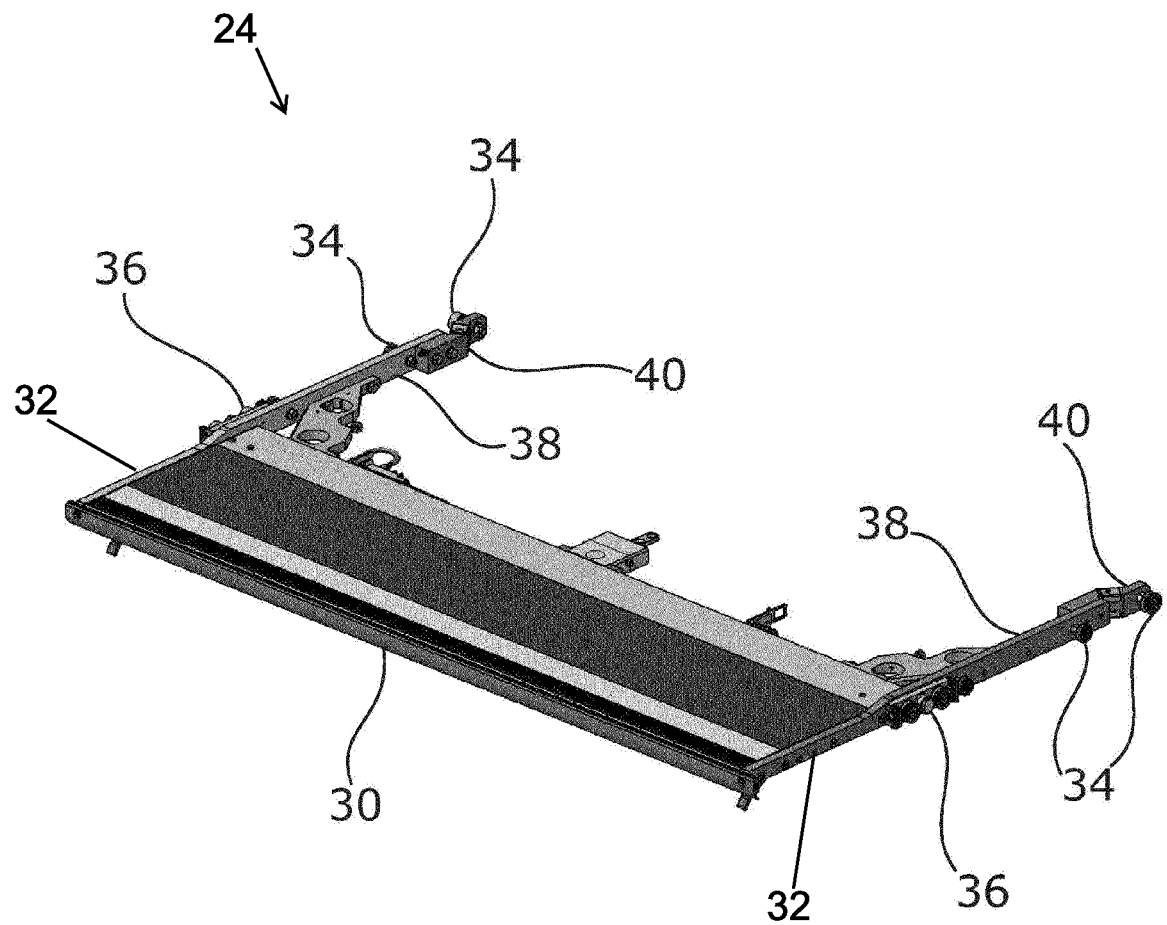
FIG. 2 shows the tread plate from FIG. 1.

FIG. 2 shows tread plate 24 in removed condition. It is substantially formed of a tread surface 30 and two lateral arms 32 with associated rollers 34. The tread surface 30 extends between the two lateral arms 32 in a substantially horizontal plane. Rollers 34 run on tracks, which are arranged inside frame 26 and extend in foldout/retraction direction. FIG. 2 shows a tread surface 30 with two rear rollers 34 and a rocker roller assembly 36 which is farther to the front—in foldout direction—and carries four other rollers 34.

The lateral arms 32 are formed by a lateral arm assembly 38 and a sensor arm assembly 40, whereby the sensor arm assembly 40 is arranged at the rear free end—in foldout direction—of each lateral arm assembly 38.

Figure 3:
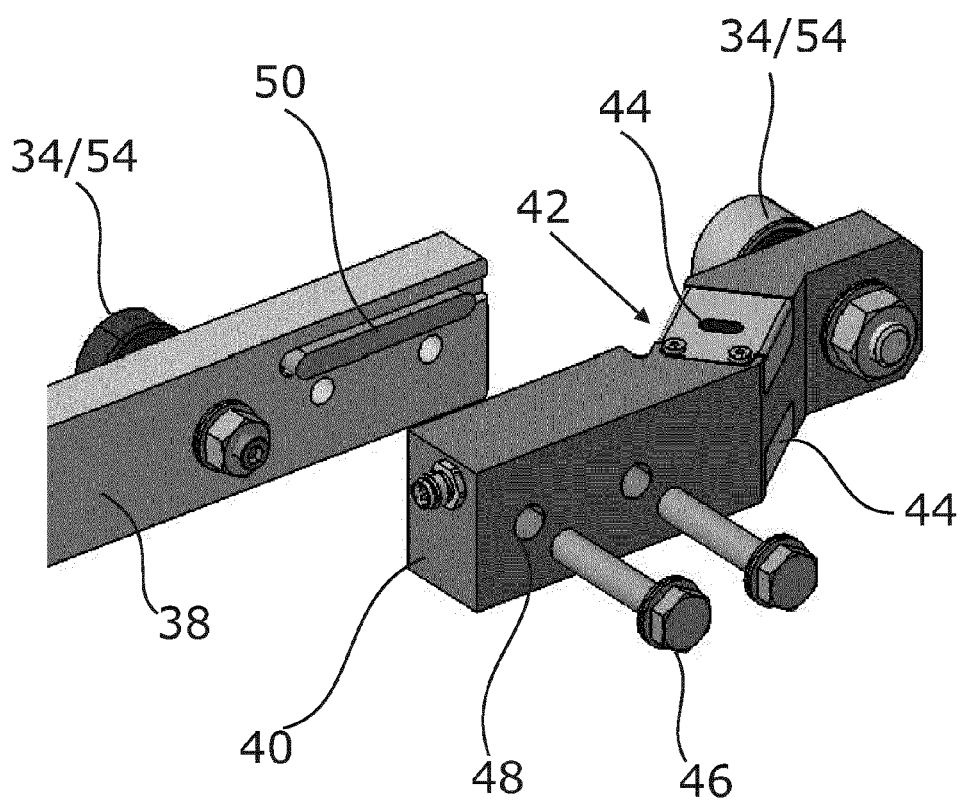
FIG. 3 shows a sensor arm assembly and a lateral arm assembly with cylindrical track rollers, in foldout direction, right.
Figure 4:
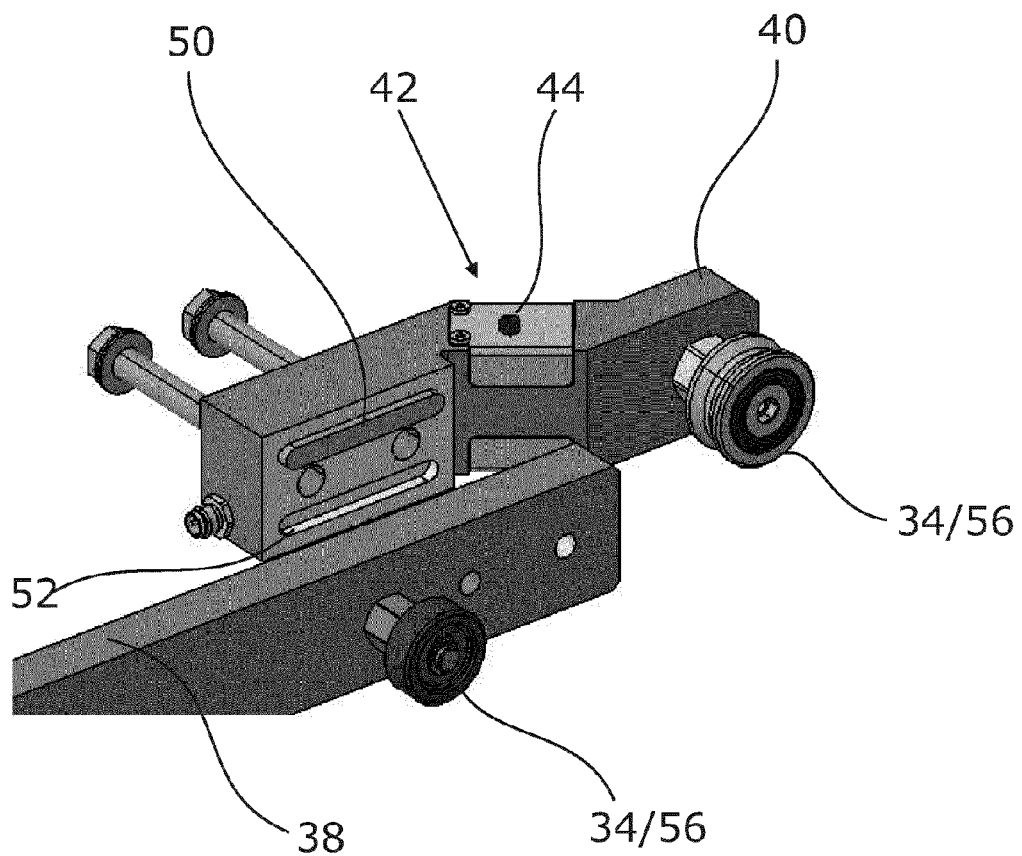
FIG. 4 shows a sensor arm assembly and a lateral arm assembly with cylindrical track rollers, in foldout direction, left.

In FIGS. 3 and 4, the sensor arm assembly 40 is shown enlarged. It can be seen that the sensor arm assembly 40 has an offset section 42. Also shown are covers 44 under which strain gauge elements (not shown) are located. These extend in a substantially horizontal direction, and in a preferred design variant, they are pasted onto the sensor arm assembly 40 or onto the offset section 42.

It is also shown that the sensor arm assembly 40 can be positively connected to the lateral arm assembly 38, in the embodiment shown by means of a bolted connection. For this purpose, bolts 46 pass through the substantially horizontal bore drill holes 48. Furthermore, feather keys 50 are provided to transmit the shear forces. In the embodiment shown, these extend above or below drill holes 48 in foldout/retraction direction. The feather keys 50 protrude in relation to the lateral arm assembly 38 or sensor arm element 40 and in their mutually assembled state extend into an opposite groove 52. The drill holes 48, the feather keys 50 and the grooves 52 are designed such that no modification is necessary with sensor arm assembly 40 when it has to be attached in foldout/retraction direction to the right or left of one of the two lateral arm assemblies 38.

To facilitate the optimal detection of the forces that may occur, cylindrical rollers 54 are provided on one side and profile rollers 56 on the other side. The profile rollers 56 run on one of the rails and can absorb lateral forces.

The invention is not limited to the shown embodiment, but comprises similar design variants, which take advantage to the substantial teaching of the invention. In particular, the technical characteristics mentioned in the description and the claims can be combined with each other in a useful fashion.

The invention claimed is:

1. A sliding step for a public transit vehicle, comprising:
   a tread plate including two lateral arms, a tread surface located between the lateral arms, and at least two rollers at each lateral arm to run on a track attached to the vehicle,
   wherein the tread plate is configured to be horizontally extended or retracted by a drive,
   wherein at least one of the lateral arms is formed in two portions, the two portions including a lateral arm assembly portion and a sensor arm assembly portion, and the lateral arm assembly portion and the sensor arm assembly portion each including at least one roller;
   wherein said at least one of the lateral arms includes an offset section which includes a strain gauge element to detect deformation, and the offset section is located between the at least one roller of the lateral arm assembly portion and the at least one roller of the sensor arm assembly portion.

2. A sliding step as defined in claim 1, wherein a portion of the at least one of the lateral arms is offset in the horizontal plane relative to another portion thereof.

3. A sliding step as defined in claim 1, wherein the at least one strain gauge element includes at least two strain gauge elements.

4. A sliding step as defined in claim 3, wherein the at least two strain gauge elements extend in a substantially horizontal plane and substantially measure deformation in vertical direction.

5. A sliding step as defined in claim 3, wherein at least one of the at least two strain gauge elements extends in a substantially horizontal plane and substantially measures deformations in vertical direction, and at least one of the at least two strain gauge elements extends in a substantially vertical plane and substantially measures deformations in a horizontal direction.

6. A sliding step as defined in claim 1, wherein the strain gauge element is a strain gauge measuring strip.

7. A sliding step as defined in claim 1, wherein the lateral arm assembly portion is substantially straight, the sensor arm assembly portion includes the offset section, and whereby the lateral arm assembly portion and the sensor arm assembly portion are connected to each other.

8. A sliding step as defined in claim 7, wherein the lateral arm assembly portion and the sensor arm assembly portion are releasably connected to each other via a bolted connection.

9. A sliding step as defined in claim 8, further comprising at least one feather key adjacent to the bolted connection.

10. A sliding step as defined in claim 1, wherein each of the two lateral arms includes said offset section including a strain gauge element.

11. A sliding step as defined in claim 1, wherein at least one roller of at the least one of the lateral arms is a profile roller.

* * * * *